United States Patent
Zheng et al.

(10) Patent No.: US 7,639,955 B2
(45) Date of Patent: *Dec. 29, 2009

(54) METHOD AND APPARATUS FOR TRANSMITTING A SIGNAL USING A CHIRP MANAGED LASER (CML) AND AN OPTICAL SPECTRUM RESHAPER (OSR) BEFORE AN OPTICAL RECEIVER

(75) Inventors: Xueyan Zheng, Culver City, CA (US); Yasuhiro Matsui, Lawrence, MA (US); Daniel Mahgerefteh, Los Angeles, CA (US); Parviz Tayebati, Boston, MA (US)

(73) Assignee: Finisar Corporation, Sunnyvale, CA (US)

( * ) Notice: Subject to any disclaimer, the term of this patent is extended or adjusted under 35 U.S.C. 154(b) by 520 days.

This patent is subject to a terminal disclaimer.

(21) Appl. No.: 11/447,662

(22) Filed: Jun. 6, 2006

(65) Prior Publication Data

US 2007/0147847 A1 Jun. 28, 2007

Related U.S. Application Data

(63) Continuation-in-part of application No. 11/272,100, filed on Nov. 8, 2005, and a continuation-in-part of application No. 11/441,944, filed on May 26, 2006, and a continuation-in-part of application No. 10/933,081, filed on Sep. 2, 2004, now Pat. No. 7,406,267, and a continuation-in-part of application No. 11/068,032, filed on Feb. 28, 2005, and a continuation-in-part of application No. 11/084,633, filed on Mar. 18, 2005, now abandoned, and a continuation-in-part of application No. 11/084,630, filed on Mar. 18, 2005, now Pat. No. 7,406,266.

(60) Provisional application No. 60/687,745, filed on Jun. 6, 2005.

(51) Int. Cl.
H04B 10/06 (2006.01)
(52) U.S. Cl. ...................................................... 398/212
(58) Field of Classification Search ................ 398/187, 398/201, 212
See application file for complete search history.

(56) References Cited

U.S. PATENT DOCUMENTS 3,324,295 A  6/1967  Harris (Continued)

FOREIGN PATENT DOCUMENTS

GB  2107147  4/1983

(Continued)

OTHER PUBLICATIONS

Alexander et al., Passive Equalization of Semiconductor Diode Laser Frequency Modulation, Journal of Lightwave Technology, Jan. 11-23, 1989, vol. 7, No. 1.

(Continued)

Primary Examiner—Leslie Pascal
(74) Attorney, Agent, or Firm—Workman Nydegger

(57) ABSTRACT

A method for transmitting a signal and a fiber optic system comprising: a frequency modulated source; an optical transmission fiber positioned to receive the output of the frequency modulated source; an optical filter positioned to receive the output of the optical transmission fiber; and an optical receiver positioned to receive the output of the optical filter; characterized in that: an optical spectrum reshaper is positioned between the frequency modulated source and the optical transmission fiber; and wherein the optical filter is a narrow band pass filter relative to the bit rate of the transmitted signal; and further wherein the frequency excursion of the frequency modulated source is between 20% and 120% of the bit rate frequency.

8 Claims, 9 Drawing Sheets

U.S. PATENT DOCUMENTS

| | | | |
|---|---|---|---|
| 3,999,105 | A | 12/1976 | Archey et al. |
| 4,038,600 | A | 7/1977 | Thomas et al. |
| 4,561,119 | A | 12/1985 | Epworth |
| 4,805,235 | A | 2/1989 | Henmi |
| 4,841,519 | A | 6/1989 | Nishio |
| 5,293,545 | A | 3/1994 | Huber |
| 5,325,378 | A | 6/1994 | Zorabedian |
| 5,371,625 | A | 12/1994 | Wedding et al. |
| 5,412,474 | A | 5/1995 | Reasenberg et al. |
| 5,416,629 | A | 5/1995 | Huber |
| 5,465,264 | A | 11/1995 | Buhler et al. |
| 5,477,368 | A | 12/1995 | Eskildsen et al. |
| 5,550,667 | A | 8/1996 | Krimmel et al. |
| 5,737,104 | A | 4/1998 | Lee et al. |
| 5,777,773 | A | 7/1998 | Epworth et al. |
| 5,805,235 | A | 9/1998 | Bedard |
| 5,856,980 | A | 1/1999 | Doyle et al. |
| 5,920,416 | A | 7/1999 | Beylat et al. |
| 5,953,139 | A | 9/1999 | Nemecek et al. |
| 5,974,209 | A | 10/1999 | Cho et al. |
| 6,081,361 | A | 6/2000 | Adams et al. |
| 6,096,496 | A | 8/2000 | Frankel |
| 6,104,851 | A | 8/2000 | Mahgerefteh |
| 6,115,403 | A | 9/2000 | Brenner et al. |
| 6,188,499 | B1 * | 2/2001 | Majima ............... 398/208 |
| 6,222,861 | B1 | 4/2001 | Kuo et al. |
| 6,271,959 | B1 | 8/2001 | Kim et al. |
| 6,298,186 | B1 | 10/2001 | He |
| 6,331,991 | B1 | 12/2001 | Mahgerefteh |
| 6,359,716 | B1 | 3/2002 | Taylor |
| 6,473,214 | B1 * | 10/2002 | Roberts et al. ............. 398/183 |
| 6,506,342 | B1 | 1/2003 | Frankel |
| 6,563,623 | B1 | 5/2003 | Penninckx et al. |
| 6,577,013 | B1 | 6/2003 | Glenn et al. |
| 6,618,513 | B2 | 9/2003 | Evankow, Jr. |
| 6,654,564 | B1 | 11/2003 | Colbourne et al. |
| 6,665,351 | B2 | 12/2003 | Hedberg et al. |
| 6,748,133 | B2 | 6/2004 | Liu et al. |
| 6,778,307 | B2 | 8/2004 | Clark |
| 6,810,047 | B2 | 10/2004 | Oh et al. |
| 6,836,487 | B1 | 12/2004 | Farmer et al. |
| 6,847,758 | B1 | 1/2005 | Watanabe |
| 6,947,206 | B2 | 9/2005 | Tsadka et al. |
| 6,963,685 | B2 | 11/2005 | Mahgerefteh et al. |
| 7,013,090 | B2 | 3/2006 | Adachi et al. |
| 7,054,538 | B2 | 5/2006 | Mahgerefteh et al. |
| 7,076,170 | B2 | 7/2006 | Choa |
| 7,123,846 | B2 | 10/2006 | Tateyama et al. |
| 7,263,291 | B2 | 8/2007 | Mahgerefteh et al. |
| 7,280,721 | B2 | 10/2007 | McCallion et al. |
| 7,376,352 | B2 * | 5/2008 | Tayebati et al. ............. 398/147 |
| 2002/0154372 | A1 | 10/2002 | Chung et al. |
| 2002/0159490 | A1 | 10/2002 | Karwacki |
| 2002/0176659 | A1 | 11/2002 | Lei et al. |
| 2003/0002120 | A1 | 1/2003 | Choa |
| 2003/0067952 | A1 | 4/2003 | Tsukiji et al. |
| 2003/0099018 | A1 | 5/2003 | Singh et al. |
| 2003/0147114 | A1 | 8/2003 | Kang et al. |
| 2003/0193974 | A1 | 10/2003 | Frankel et al. |
| 2004/0008933 | A1 | 1/2004 | Mahgerefteh et al. |
| 2004/0008937 | A1 | 1/2004 | Mahgerefteh et al. |
| 2004/0036943 | A1 | 2/2004 | Freund et al. |
| 2004/0096221 | A1 | 5/2004 | Mahgerefteh et al. |
| 2004/0218890 | A1 | 11/2004 | Mahgerefteh et al. |
| 2005/0100345 | A1 | 5/2005 | Welch et al. |
| 2005/0111852 | A1 | 5/2005 | Mahgerefteh et al. |
| 2005/0175356 | A1 | 8/2005 | McCallion et al. |
| 2005/0206989 | A1 | 9/2005 | Marsh |
| 2005/0271394 | A1 | 12/2005 | Whiteaway et al. |
| 2005/0286829 | A1 | 12/2005 | Mahgerefteh et al. |
| 2006/0002718 | A1 | 1/2006 | Matsui et al. |
| 2006/0018666 | A1 | 1/2006 | Matsui et al. |
| 2006/0029358 | A1 | 2/2006 | Mahgerefteh et al. |
| 2006/0029396 | A1 | 2/2006 | Mahgerefteh et al. |
| 2006/0029397 | A1 | 2/2006 | Mahgerefteh et al. |
| 2006/0228120 | A9 | 10/2006 | McCallion et al. |
| 2006/0233556 | A1 | 10/2006 | Mahgerefteh et al. |
| 2006/0274993 | A1 | 12/2006 | Mahgerefteh et al. |

FOREIGN PATENT DOCUMENTS

| | | |
|---|---|---|
| WO | 9905804 | 2/1999 |
| WO | 0104999 | 1/2001 |
| WO | 03005512 | 1/2003 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled Microring Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Li, Yuan P., et al., Chapter 8: Silicon Optical Bench Waveguide Technology, Optical Fiber Communications, 1997, 319-370, vol. 111B, Lucent Technologies, New York.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb 13, 1997, vol. 33(4).

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Corvini, P.J. et al., Computer Simulation of High-Bit-Rate Optical Fiber Transmission Using Single-Frequency Lasers, Journal of Lightwave Technology, Nov. 1987, 1591-1595, vol. LT-5, No. 11.

Brent E. Little, Advances in MicroRing Resonators, Integrated Photonics Research Conference 2003.

Hamutal Shalom et al., On the Various Time Constants of Wavelength Changes of a DFB Laser Under Direct Modulation, IEEE Journal of Quantum Electronics, Oct. 1998, pp. 1816-1822, vol. 34, No. 10.

Yu et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Prokais, John G., Digital Communications, 2001, 202-207, Fourth Edition, McGraw Hill, New York.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Kurtzke, C. et al., Impact of Residual Amplitude Modulation on the Performance of Dispersion-Supported and Dispersion-Mediated Nonlinearity-Enhanced Transmission, Electronics Letters, Jun. 9, 1994, 988-990, vol. 30, No. 12.

Rasmussen, C.J. et al., Optimum Amplitude-and Frequency-Modulation in an Optical Communication System Based on Dispersion Supported Transmission, Electronics Letters, Apr. 27, 1995, 746-747, vol. 31, No. 9.

Wedding, B., Analysis of Fibre Transfer Function and Determination of Receiver Frequency Response for Dispersion Supported Transmission, Electronics Letters, Jan. 6, 1994, 58-59, vol. 30, No. 1.

* cited by examiner

METHOD AND APPARATUS FOR TRANSMITTING A SIGNAL USING A CHIRP MANAGED LASER (CML) AND AN OPTICAL SPECTRUM RESHAPER (OSR) BEFORE AN OPTICAL RECEIVER

REFERENCE TO PENDING PRIOR PATENT APPLICATIONS

This patent application:

(1) is a continuation-in-part of pending prior U.S. patent application Ser. No. 11/272,100, filed Nov. 8, 2005 by Daniel Mahgerefteh et al. for POWER SOURCE FOR A DISPERSION COMPENSATION FIBER OPTIC SYSTEM;

(2) is a continuation-in-part of pending prior U.S. patent application Ser. No. 11/441,944, filed May 26, 2006 by Daniel Mahgerefteh et al. for FLAT DISPERSION FREQUENCY DISCRIMINATOR (FDFD);

(3) is a continuation-in-part of prior U.S. patent application Ser. No. 10/933,081, filed Sep. 2, 2004 now U.S. Pat. No. 7,406,267 by Daniel Mahgerefteh et al. for METHOD AND APPARATUS FOR TRANSMITTING A SIGNAL USING THERMAL CHIRP MANAGEMENT OF A DIRECTLY MODULATED TRANSMITTER (4) is a continuation-in-part of pending prior U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT;

(5) is a continuation-in-part of prior U.S. patent application Ser. No. 11/084,633, filed Mar. 18, 2005 now abandoned by Daniel Mahgerefteh et al. for METHOD AND APPARATUS FOR TRANSMITTING A SIGNAL USING SIMULTANEOUS FM AND AM MODULATION;

(6) is a continuation-in-part of prior U.S. patent application Ser. No. 11/084,630, filed Mar. 18, 2005 now U.S. Pat. No. 7,406,266 by Daniel Mahgerefteh et al. for FLAT-TOPPED CHIRP INDUCED BY OPTICAL FILTER EDGE; and (7) claims benefit of prior U.S. Provisional Patent Application Ser. No. 60/687,745, filed Jun. 6, 2005 by Xueyan Zheng et al. for METHOD AND APPARATUS FOR TRANSMITTING A SIGNAL USING CML AND OSR BEFORE OPTICAL RECEIVER.

The seven above-identified patent applications are hereby incorporated herein by reference.

FIELD OF THE INVENTION

This invention relates to methods and apparatus for transmitting a signal, and more particularly to the transmission of optical signals in an optical telecommunications network.

BACKGROUND OF THE INVENTION

The key system parameters that affect the performance of a digital transmission system in long haul Dense Wavelength Division Multiplex (DWDM) transmission systems are fiber dispersion, optical noise and optical fiber nonlinearity. Long haul systems typically span over 1000 km. Fiber dispersion distorts transmitted pulses and increases the probability of errors in the digital transmission. Also, the optical signal is amplified periodically along the fiber (typically every 80 km), generally using an erbium doped fiber amplifier (EDFA), to compensate for loss in the transmission fiber. This amplification is accompanied by degradation in the optical signal-to-noise ratio (OSNR) of the signal, which also increases the probability of errors. This degradation can be partly mitigated by increasing the signal power launched into the fiber. However, increasing launch power tends to increase optical fiber nonlinearities, which in turn degrade the signal. The fiber nonlinear effects include self phase modulation (SPM), cross phase modulation (XPM), four waves mixing (FWM), stimulated Brillion scattering (SBS) and stimulated Raman scattering (SRS), all of which are well known in the art.

In a long haul DWDM transmission system, the digital signal is typically intensity modulated: the 1 bits have substantially higher power than the 0 bits. The ratio of power in the 1 bits to the power in the 0 bits is called the extinction ratio, and is typically 10-13 dB. Since nonlinear effects scale with instantaneous optical power, as opposed to average power, the 1 bits and 0 bits have different nonlinear effects. Also, for a non-return-to-zero (NRZ) coding, a sequence of 1s (e.g., 0110) has a lower peak power than an isolated 1 bit (e.g., 010). Therefore, different patterns experience different distortions in the presence of nonlinearity and fiber dispersion. Higher optical dispersion exacerbates the effect of nonlinearity. Furthermore, nonlinear distortion cannot be compensated for by dispersion-compensating fiber.

Several methods have been proposed to improve dispersion tolerance of transmission in the presence of optical nonlinearity: the use of distributed Raman amplifiers, the use of a return-to-zero (RZ) transmission format, the use of a differential phase shift keying (DPSK) format, the use of an optical duobinary format, the use of electronic dispersion compensation (EDC), etc.

Up to now, no one method has adequately addressed the foregoing optical transmission issues without significantly complicating system design. Also, some of the above-identified solutions require a carefully designed dispersion map. This means that dispersion-compensating fibers need to be installed with appropriately designed values of dispersion along the length of the transmission system so as to generate the desired "dispersion map" for best performance.

The DPSK format can improve system tolerance to nonlinear effects, but with little improvement of dispersion tolerance. With distributed Raman amplifiers, WDM system can also improve dispersion tolerance, but does not improve nonlinear tolerance. An optical duobinary format has +/−3000 ps/nm of dispersion tolerance, but is not tolerant to dispersion in the presence of nonlinearity. As is known in the art, electronic dispersion compensation (EDC) can only increase system performance marginally due to the nonlinearity in the detector. The RZ format allows higher launch power and increases OSNR but at the cost of reducing dispersion tolerance.

It is, therefore, an object of the present invention to increase the dispersion tolerance of a transmission system in the presence of optical nonlinearity.

SUMMARY OF THE INVENTION

These and other objects are addressed by the provision and use of a novel method and apparatus for transmitting a signal using a chirp managed laser (CML) and an optical spectrum reshaper (OSR) before an optical receiver.

In one form of the invention, there is provided a fiber optic system comprising:

a frequency modulated source;

an optical transmission fiber positioned to receive the output of the frequency modulated source;

an optical filter positioned to receive the output of the optical transmission fiber; and an optical receiver positioned to receive the output of the optical filter;

characterized in that:

an optical spectrum reshaper is positioned between the frequency modulated source and the optical transmission fiber;

and wherein the optical filter is a narrow band pass filter relative to the bit rate of the transmitted signal;

and further wherein the frequency excursion of the frequency modulated source is between 20% and 120% of the bit rate frequency.

In another form of the invention, there is provided a fiber optic system comprising:

a frequency modulated source;

an optical transmission fiber positioned to receive the output of the frequency modulated source;

an optical filter positioned to receive the output of the optical transmission fiber; and an optical receiver positioned to receive the output of the optical filter;

characterized in that:

the optical filter is an optical spectrum reshaper;

and wherein the frequency excursion of the frequency modulated source is between 20% and 120% of the bit rate frequency.

In another form of the invention, there is provided an optical receiver for use with a transmission system comprising a frequency modulated source and an optical transmission fiber positioned to receive the output of the frequency modulated source, wherein the optical receiver comprises:

an optical filter positioned to receive the output of the optical transmission fiber; and a photodetector positioned to receive the output of the optical filter;

characterized in that:

an optical spectrum reshaper is positioned between the frequency modulated source and the optical transmission fiber;

and wherein the optical filter is a narrow bandwidth optical filter relative to the bit rate of the transmitted signal;

and further wherein the frequency excursion of the frequency modulated source is between 20% and 120% of the bit rate frequency.

In another form of the invention, there is provided an optical receiver for use with a transmission system comprising a frequency modulated source and an optical transmission fiber positioned to receive the output of the frequency modulated source, wherein the optical receiver comprises:

an optical filter positioned to receive the output of the optical transmission fiber; and a photodetector positioned to receive the output of the optical filter;

characterized in that:

the optical filter is an optical spectrum reshaper;

and wherein the frequency excursion of the frequency modulated source is between 20% and 120% of the bit rate frequency.

In another form of the invention, there is provided a method for transmitting a signal, comprising:

using the signal to frequency modulate an optical source, wherein the frequency excursion of the frequency modulated source is between 20% and 120% of the bit rate frequency;

directing the output of the frequency modulated source into an optical spectrum reshaper;

directing the output of the optical spectrum reshaper into an optical transmission fiber;

directing the output of the optical transmission fiber into an optical filter, wherein the optical filter is a narrow band pass filter relative to the bit rate of the transmitted signal; and directing the output of the optical filter into an optical receiver.

In another form of the invention, there is provided a method for transmitting a signal, comprising:

using the signal to frequency modulate an optical source, wherein the frequency excursion of the frequency modulated source is between 20% and 120% of the bit rate frequency;

directing the output of the frequency modulated source into an optical transmission fiber;

directing the output of the optical transmission fiber into an optical filter, wherein the optical filter is an optical spectrum reshaper; and directing the output of the optical spectrum reshaper into an optical receiver.

BRIEF DESCRIPTION OF THE DRAWINGS

These and other objects and features of the present invention will be more fully disclosed or rendered obvious by the following detailed description of the invention, which is to be considered together with the accompanying drawings wherein.

DETAILED DESCRIPTION OF THE INVENTION

In General

Figure 1:
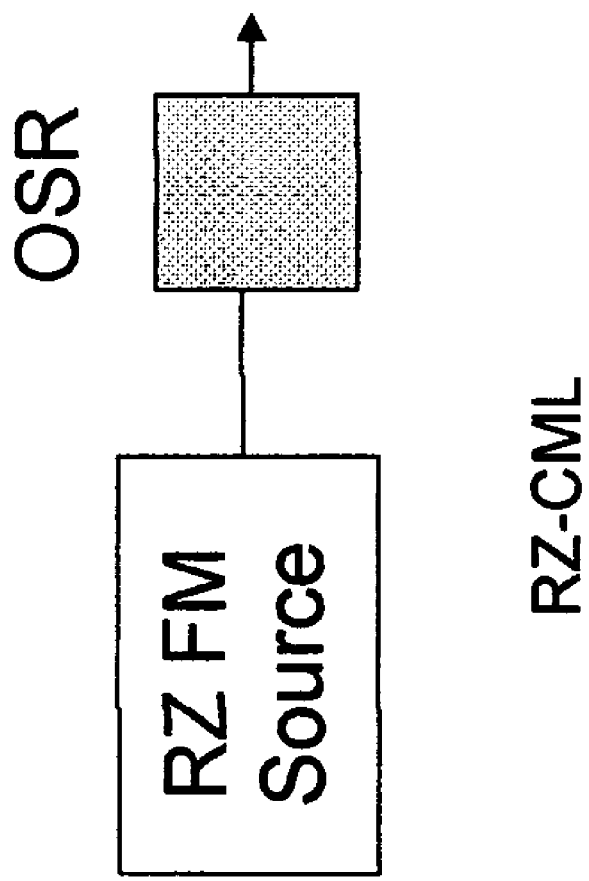
FIG. 1(a) is a schematic illustration showing the RZ-CML transmitter.
FIG. 1(b) is a schematic illustration showing the optical spectrum of an RZ-CML transmitter.
Figure 1:
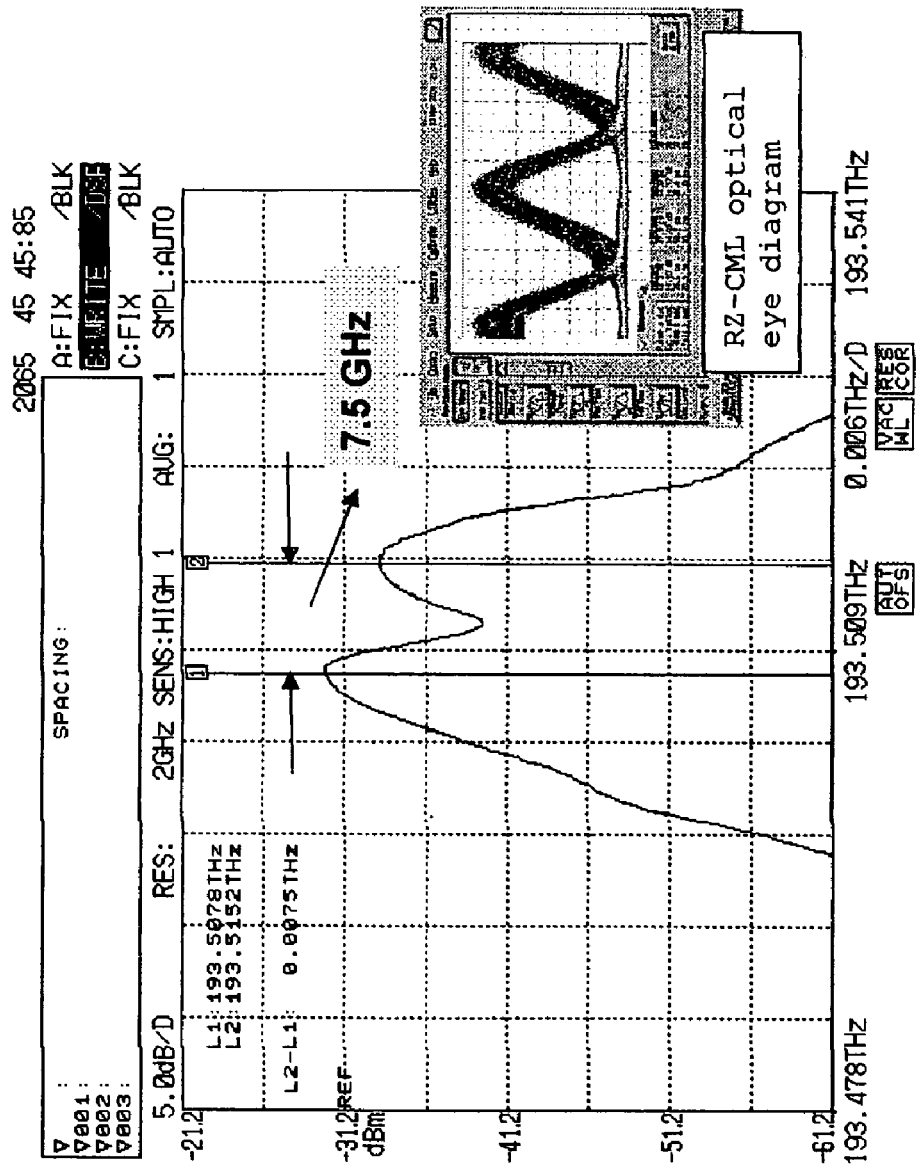

An optical transmitter with a high degree of dispersion tolerance has been disclosed in: (i) pending prior U.S. patent application Ser. No. 10/933,081, filed Sep. 2, 2004 by Daniel Mahgerefteh et al. for METHOD AND APPARATUS FOR TRANSMITTING A SIGNAL USING THERMAL CHIRP MANAGEMENT OF A DIRECTLY MODULATED TRANSMITTER; and (ii) pending prior U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT; which patent applications are hereby incorporated herein by reference. This optical transmitter, which comprises a directly modulated frequency modulated source and an optical spectrum reshaper (OSR) filter element, is sometimes called a Chirp Managed Laser (CML™) by Azna LLC of Wilmington, Mass.

As used herein, the term optical spectrum reshaper (OSR) refers to an optical element having a frequency dependent transmission spectrum which is selected, relative to the input signal, so as to reshape the amplitude profile and the frequency profile of the input signal in a desired manner. When the OSR is placed after a frequency modulated (FM) optical signal, the resulting output signal (i.e., the signal exiting the OSR) has an increased amplitude modulation as well as a substantially reshaped frequency profile. The reshaped frequency profile is characterized by one or more of several features:

(1) a flat-topped and square shaped frequency profile, such that the rise times and fall times of the instantaneous frequency profile are shorter than the rise times and fall times and of the intensity profile, as described in: (i) pending prior U.S. patent application Ser. No. 11/084,633, filed Mar. 18, 2005 by Daniel Mahgerefteh et al. for METHOD AND APPARATUS FOR TRANSMITTING A SIGNAL USING SIMULTANEOUS FM AND AM MODULATION; and (ii) pending prior U.S. patent application Ser. No. 11/084,630, filed Mar. 18, 2005 by Daniel Mahgerefteh et al. for FLAT-TOPPED CHIRP INDUCED BY OPTICAL FILTER EDGE; which patent applications are hereby incorporated herein by reference—in other words, the frequency profile is characterized by abrupt transitions at the rising and falling edges of the pulses; or (2) peaked chirp at the transitions of the pulses, with abrupt transitions—in other words, blue-shifted transient chirp generated by the OSR.

The resulting optical signal at the output of such an OSR has a significantly higher tolerance to dispersion beyond the dispersion limit. The dispersion limit at a bit rate is defined as the maximum transmission distance that can be achieved with a standard chirp-free optical transmitter, such as an externally modulated Lithium Niobate Mach-Zehnder modulator transmitter, with less than 2 dB sensitivity penalty, as is known in the art.

In a preferred construction, the OSR's transmission shape, slope and operating point are selected so as to increase the amplitude profile, and flatten the frequency profile, so as to substantially exceed the normal dispersion limit of the fiber at the bit rate of operation.

Two Approaches

In this invention, we provide two approaches to realize higher dispersion tolerance and better OSNR performance.

First Approach

In one embodiment of the present invention, the transmission system comprises a chirp managed laser (CML) transmitter, an optical fiber, and a narrow band optical filter before the receiver. By controlling the adiabatic chirp of the RZ-CML, a carrier suppressed, and spectrum narrowed, RZ signal can be realized. For a 10 Gb/s RZ signal with a 50% duty cycle, for example, the required chirp for the narrowest spectrum is ~10 GHz +/−25% (i.e., 7.5 GHz to 12.5 GHz) depending on the pulse shape. The following relationship should be satisfied in order to obtain the narrowest spectrum:

$$2\pi \cdot \text{adiabatic chirp} \cdot T \cdot \text{duty cycle} \sim \pi \quad (1)$$

$$T: \text{period of optical signal.} \quad (2)$$

FIG. 1(a) shows the proposed RZ-CML transmitter. In a preferred embodiment, the FM source is a distributed feedback (DFB) laser. A driver provides return-to-zero (RZ) modulation to directly modulate the bias to the laser. Significantly, the driver has means for changing the duty cycle of the input digital signal before applying it to the laser. The benefits of providing duty cycle control before the laser has been described in pending prior U.S. patent application Ser. No. 10/933,081, filed Sep. 2, 2004 by Daniel Mahgerefteh et al. for METHOD AND APPARATUS FOR TRANSMITTING A SIGNAL USING THERMAL CHIRP MANAGEMENT OF A DIRECTLY MODULATED TRANSMITTER; which patent application is hereby incorporated herein by reference.

As described in the aforementioned U.S. patent application Ser. No. 10/933,081, the OSR can change the duty cycle of the input optical signal from the laser as well. This changes the crossing point on the "eye diagram". The crossing point is the amplitude level where the rising and falling edges of the pulses intersect. The crossing point is in the middle of the eye (between the 1 and 0 levels) when the duty cycle is 100%. The crossing point moves below the middle for a duty cycle below 100%.

The OSR may be a multi-cavity etalon filter. The preferred spectral shape of the OSR may be one of several that has been disclosed in pending prior U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT; which patent application is hereby incorporated herein by reference.

FIG. 1(b) shows an example of the optical spectrum of an RZ-CML obtained experimentally. As FIG. 1(b) shows, the bandwidth of the RZ-CML is less than that of a standard non-return-to-zero (NRZ) signal. This bandwidth reduction is because of the π phase shift between adjacent 1 bits in the bit stream. Also, the RZ-CML provides good tolerance to fiber dispersion due to the same π phase relationship.

Figure 2:
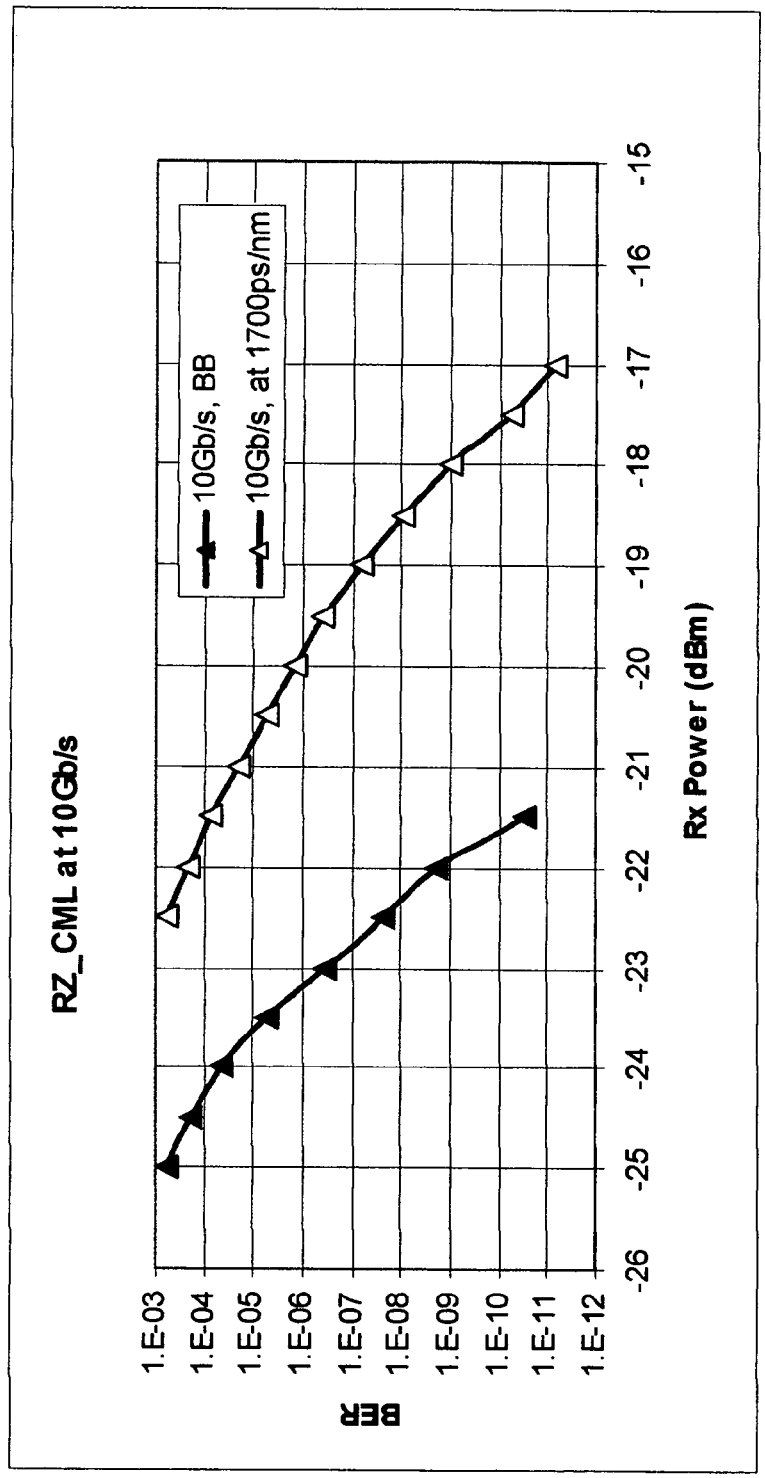
FIG. 2 is a schematic illustration showing the sensitivity of the RZ-CML transmitter after propagation through a fiber.

FIG. 2 shows the RZ-CML's sensitivity after propagation through 100 km of fiber having 1700 ps/nm dispersion. It can be seen that the dispersion penalty is ~4 dB, which is lower than that for a standard RZ signal.

Figure 3:
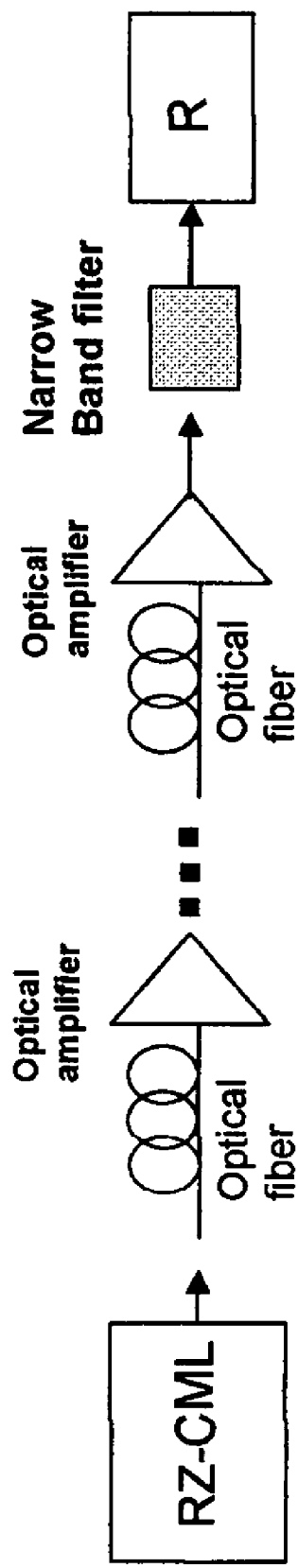
FIG. 3 is a schematic illustration showing a first embodiment of the present invention.

In one preferred embodiment of the present invention, shown in FIG. 3, the RZ-CML is used to transmit RZ data through a dispersive fiber, and a narrow optical band pass filter is placed before optical receiver to suppress optical noise. The narrow bandwidth of the resulting CML spectrum allows an increase in signal-to-noise ratio by noise rejection through the filter without signal degradation. The 3 dB bandwidth of the filter at the receiver side may be on the order of the bit rate frequency (e.g., 8-15 GHz 3 dB BW for a 10 Gb/s signal). The significance of using a chirp managed laser as a source together with a narrow band optical filter at the receiver is that the CML produces a spectrum which is narrower (typically by a factor of 2×) than that of a standard transmitter. For a conventional chirp free return-to-zero transmitter, (e.g. externally modulated lithium niobte Mach-Zehnder) the use of a narrow band filter at the receiver causes pulse distortion and increases bit error rate.

In a long haul DWDM system, the preferred embodiment of the present invention (i.e., the system shown in FIG. 3) improves dispersion tolerance while allowing higher OSNR at the receiver. The function of the filter at the receiver is to remove unwanted amplified spontaneous emission (ASE) noise generated by EDFAs in the system. With the embodiment shown in FIG. 3, the spectral position of the input signal exiting the fiber is aligned with the transmission peak of the filter at the receiver.

Second Approach

Figure 4:
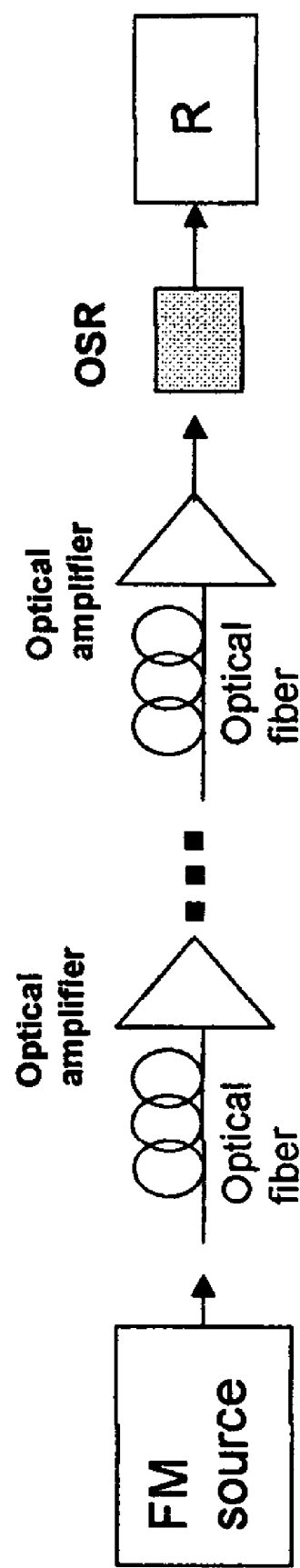
FIG. 4 is a schematic illustration showing a second embodiment of the present invention.

The current invention also provides for the use a frequency modulated (FM) source at the transmitter, an optical transmission fiber and an optical spectrum reshaper (OSR) placed before the receiver, as shown in FIG. 4. In this case, the digital signal driving the FM source may be NRZ or RZ format. The resulting signal at the output of the FM source may have an accompanying amplitude modulation. However, note that the modulation depth of the optical signal at the transmitter may be much smaller than that for a standard intensity modulated signal. The FM source may be a directly modulated distributed feedback (DFB) laser or a variety of other single wavelength or tunable semiconductor laser sources.

In the event that the FM source is a DFB laser, the laser is biased high above threshold and modulated so as to generate a desired level of adiabatic chirp. The level of chirp is typically a fraction of the bit rate frequency (e.g., 2.0 to 8.0 GHz for a 10 Gbps NRZ signal). For a DFB laser, this level of FM modulation also generates a small (1-3 dB) extinction ratio (ER) intensity modulation. The choice of adiabatic chirp has been described in pending prior U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT; which patent application is hereby incorporated herein by reference. In one embodiment, the adiabatic chirp is chosen to be about an odd half integer multiple of the bit rate frequency, e.g., ½×10 GHz=5 GHz for a 10 Gb/s signal with a 100% duty cycle. The chirp is adjusted to make the product of the zero bit duration and the chirp to be about $\pi$ (i.e., the zero bit duration*the chirp~$\pi$).

The OSR at the receiver has several functions: (i) the OSR converts frequency modulation to amplitude modulation; (ii) the OSR reshapes the frequency profile of the transmitted signal; (iii) the OSR limits the bandwidth of the signal into the receiver, which reshapes the resulting amplitude profile; and (iv) the OSR limits the noise input into the receiver.

In order to obtain these benefits, the optical signal received by the OSR is spectrally aligned with the transmission edge of the OSR to a specified operating loss point. The slope in dB/GHz of the transmission profile of the OSR and relative operating loss point on the OSR filter has been described in: (i) pending prior U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT; and (ii) pending prior U.S. patent application Ser. No. 11/441,944, filed May 26, 2006 by Daniel Mahgerefteh et al. for FLAT DISPERSION FREQUENCY DISCRIMINATOR (FDFD); which patent applications are hereby incorporated herein by reference.

The slope of the filter is chosen to generate enough extinction ratio (e.g., >10 dB) by FM-to-AM conversion. For example, if the adiabatic chirp is 4 GHz for an optimum transmission, and there is no amplitude modulation at the output of the transmitter, the slope needs to be 10 dB/4 GHz=2.5 dB/GHz in order to generate a signal with 10 dB extinction ratio. In addition, the filter slope is preferably chosen such that it converts adiabatic chirp from the laser to substantially flat-topped chirp, as described in pending prior U.S. patent application Ser. No. 11/084,630, filed Mar. 18, 2005 by Daniel Mahgerefteh et al. for FLAT-TOPPED CHIRP INDUCED BY OPTICAL FILTER EDGE; which patent application is hereby incorporated herein by reference.

In this invention, in order to get good performance at different dispersion values, the bandwidth of the OSR can be between 0.6 to 1.3 times the bit rates. The optimized chirp value is related to bit rate; for an NRZ signal, it is preferably between 0.3 times to 0.8 times bit rate.

Figure 5:
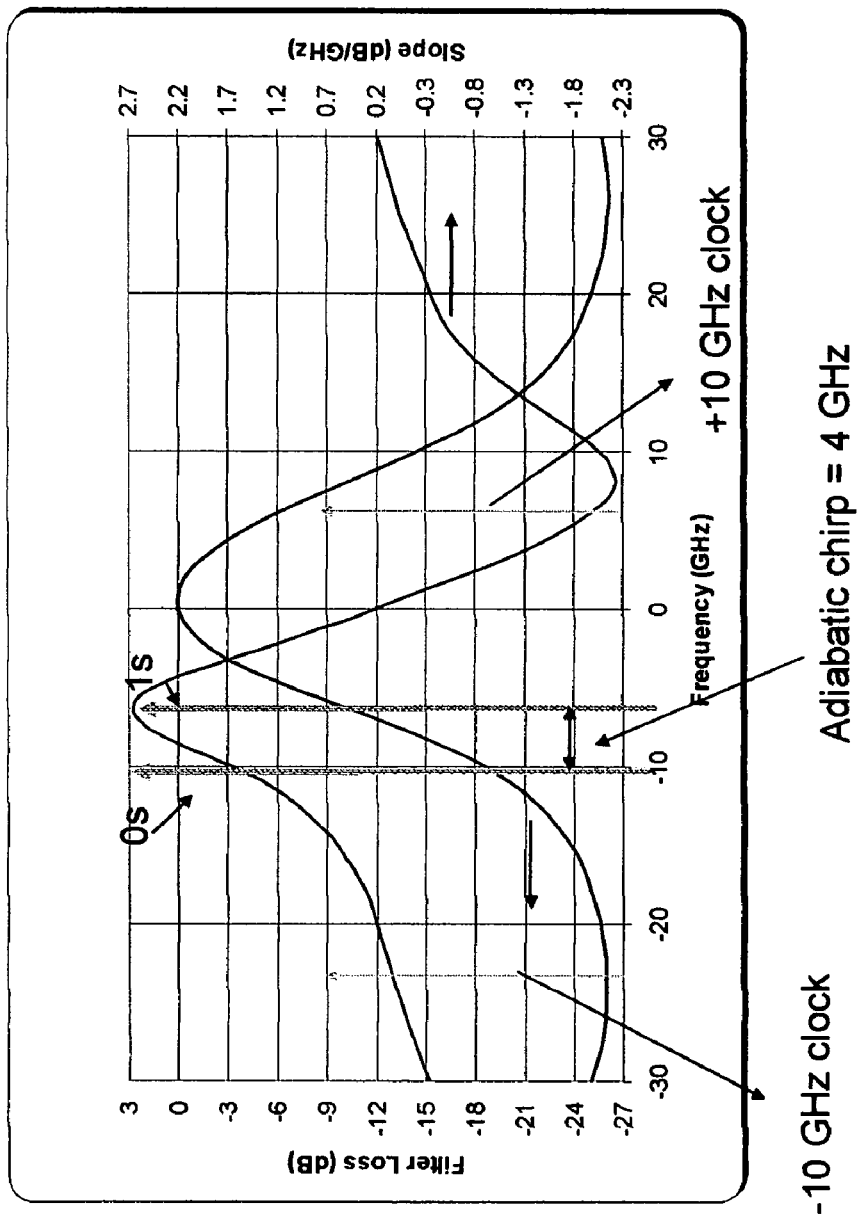
FIG. 5 is a schematic illustration showing an OSR formed by a non-Gaussian shape band pass filter.

FIG. 5 shows an example of an OSR formed by a non-Guassian shape band pass filter. FIG. 5 shows the transmission profile in dB scale as well as the derivative or frequency dependent slope of the OSR, as well as the operating loss point of the input FM signal to be reshaped. It is a preferred embodiment of the present invention that the optimal spectral position of the FM signal on the OSR be such that the is peak frequency is near the peak logarithmic derivative of the transmission profile of the OSR. In this example, the derivative is not linear on the dB scale, indicating that the OSR has a non-Gaussian spectral profile. A Guassian OSR would have a linear slope as a function of frequency. FIG. 5 also shows the position of the clock frequency components of the input FM signal, which are reduced substantially after the OSR. This will in turn reduce the clock frequency components in the RF spectrum of the resulting second signal after the OSR. In this example, the peak slope is 2.7 dB/GHz.

Figure 6:
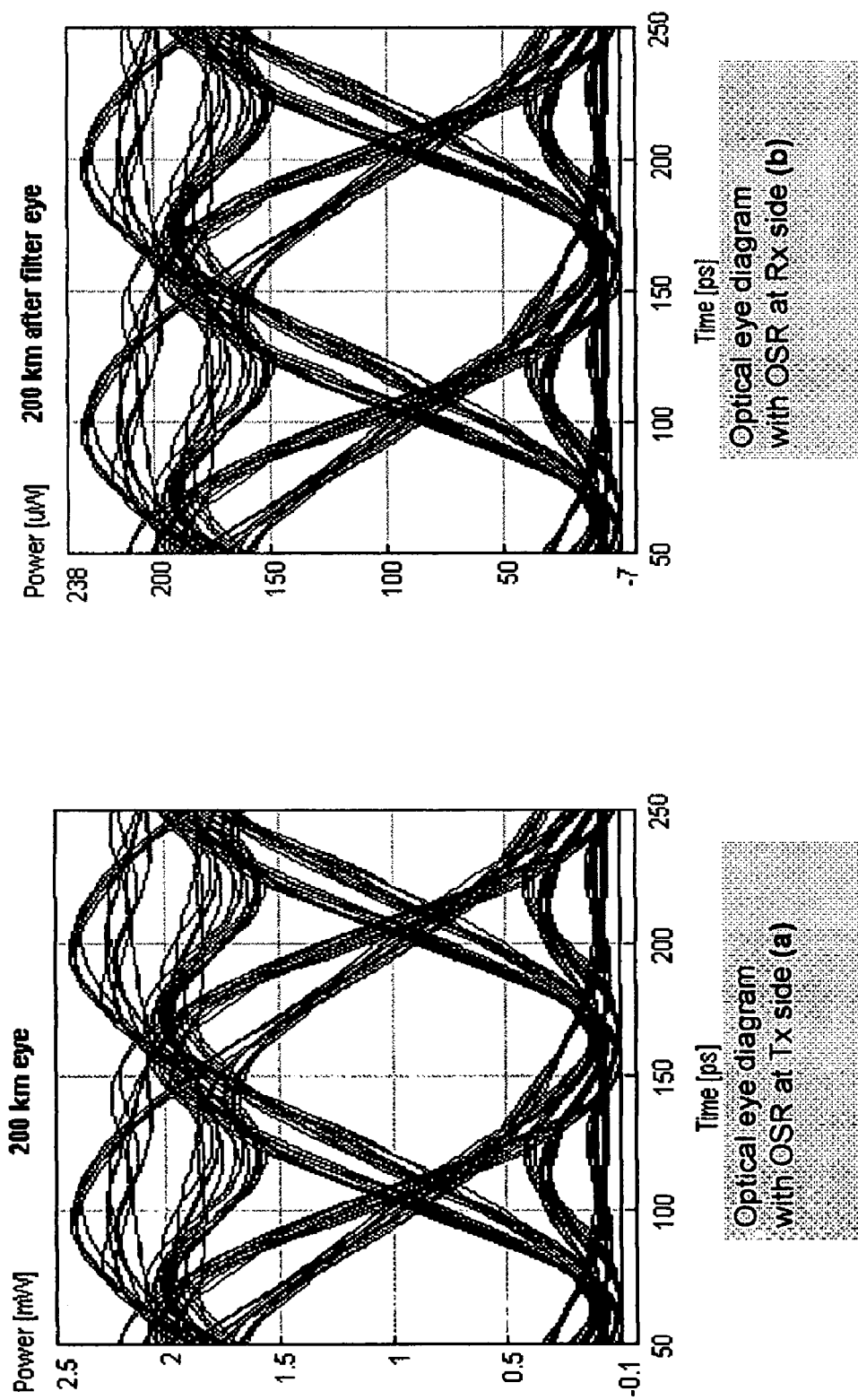
FIG. 6 is a schematic illustration showing the calculated optical eye diagrams of a directly modulated DFB laser FM source.

In accordance with the present invention, the OSR can be put anywhere in a fiber optic system, as long as the system is approximately linear; i.e., for low launch powers into the fiber. The linear regime of operation in a fiber optic system is known in the art. Most long haul transmission systems which use the NRZ format are designed to have low nonlinearity, and are therefore "nearly" linear. FIG. 6 shows the calculated optical eye diagrams of a directly modulated DFB laser FM source after propagation through 200 km of standard fiber with the OSR either (i) at the transmitter, where it is placed right after the FM source, or (ii) at the receiver side, just before the optical-to-electrical converter (e.g., a photodetector). It can be seen that there is effectively no difference in the eye diagrams for the two cases. In these situations, the launch power was kept low in order to avoid optical fiber nonlinearities.

In addition, the duty cycle of the frequency modulated signal at the output of the FM source should be adjusted in order to optimize the bit error rate at the receiver, as described in pending prior U.S. patent application Ser. No. 10/933,081, filed Sep. 2, 2004 by Daniel Mahgerefteh et al. for METHOD AND APPARATUS FOR TRANSMITTING A SIGNAL USING THERMAL CHIRP MANAGEMENT OF A DIRECTLY MODULATED TRANSMITTER; which patent application is hereby incorporated herein by reference.

The benefit of placing the optical spectrum reshaper (OSR) at the receiver becomes clear in the nonlinear case, where the launch power into the fiber is high enough to make nonlinear fiber effects significant. More particularly, high power signals slightly change the refractive index of the fiber, by the so-called Kerr effect, causing additional phase modulation to be imparted on the optical signal itself (self phase modulation) or on other signals present in the fiber at the same time (cross phase modulation). This nonlinear phase modulation or chirp can cause signal degradation because of fiber dispersion. It should be noted that in long haul systems over 1000 km, even relatively small powers (on the order of few mW) can cause significant nonlinearities since the effect accumulates with distance.

There are several advantages to putting the OSR at the receiver side in the presence of optical nonlinearity, which occur in the case of relatively higher launch powers in the fiber. First, the relatively low extinction ratio at the output of the FM source (1-3 dB) implies that the peak power is smaller than the case of standard intensity modulation, which leads to less nonlinearity. This makes it possible to launch a higher power signal into the fiber and increase the signal-to-noise ratio at the receiver. The OSR can be used both to reshape the amplitude and frequency profiles of the input optical signal and to suppress optical noise. Due to the narrow bandwidth of the OSR, it can improve OSNR performance of optical noise-dominated systems. In addition, the OSR can reshape the input pulse and reduce noise by limiting the bandwidth of the signal that is passed through to the receiver.

Figure 7:
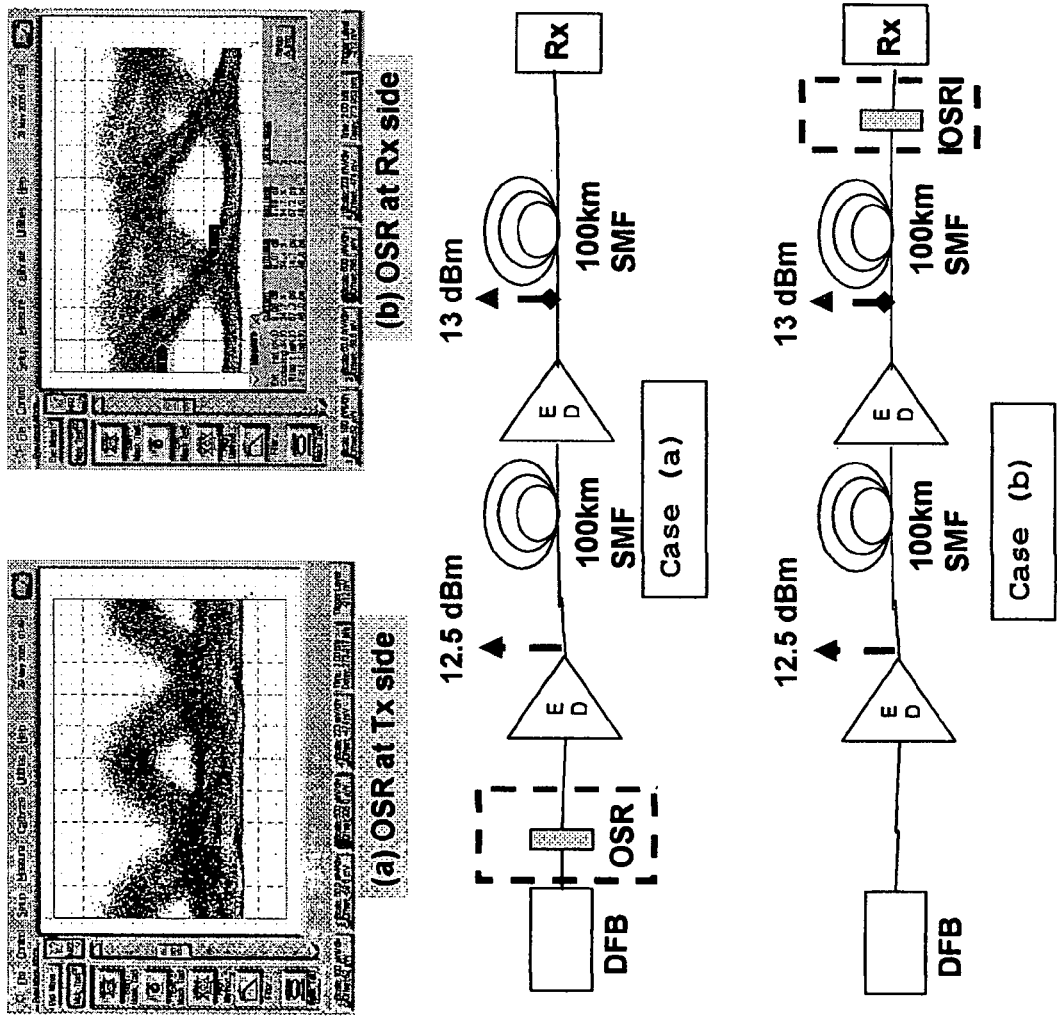
FIG. 7 is a schematic illustration showing the effect of placing the OSR at the receiver in the presence of the self phase modulation (SPM) nonlinearity.

FIG. 7 shows the effect of placing the OSR at the receiver in the presence of the self phase modulation (SPM) nonlinearity. "Case (a)" shows the eye diagram after fiber propagation for a chirp managed laser in which case the OSR is placed after a directly modulated laser (here a DFB laser). In "Case (b)", the transmitter is the same FM source as in "Case (a)", but the OSR is removed from a position between the FM source and the fiber and positioned after the fiber and before the receiver. The eye diagram in "Case (b)" is clearly more open, indicating a lower bit error rate. In these situations, two 100 km spans of standard single mode fiber are used to transmit the signal to the receiver. The total dispersion was 3400 ps/nm at the wavelength of operation and the bit rate was 10 Gb/s. Input power to the first and second spans was 12.5 dBm and 13 dBm, respectively. The launch power was intentionally kept high so as to induce nonlinearity in the fiber. As FIG. 7 shows, the eye is completely closed in "Case (a)", i.e., where the OSR was positioned at the transmitter end.

Wavelength Tracking of the OSR at the Receiver

In order to ensure stability of the foregoing transmission system, where the OSR is at the receiver, it is preferable for the OSR to track the wavelength of the transmitter laser. This is because the operating point is on the transmission edge of the OSR and the OSR bandwidth is narrow (e.g., on the order of the bit rate).

Figure 8:
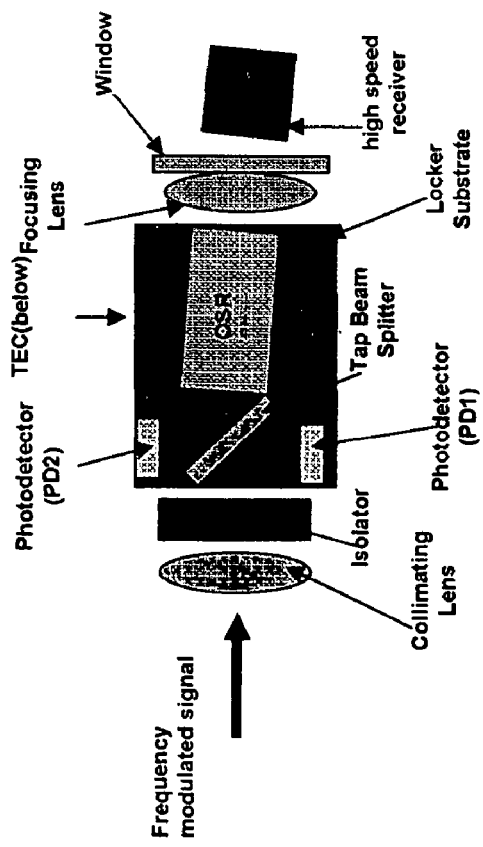
FIG. 8 is a schematic illustration showing the optical train of a receiver formed in accordance with the present invention.

FIG. 8 illustrates a tracking system where the OSR is locked to the wavelength of the incoming signal. The wavelength tracking system comprises a thermoelectric cooler (TEC), a beam splitter and two photodiodes. FIG. 8 also shows a lens and optical isolator in the path, which are respectively used to collimate the light output from the transmission fiber and prevent reflections from going back into the fiber. The TEC is used to change the temperature of the OSR in order to position the transmission peak, and hence the operating loss point of the OSR, relative to the input optical signal. For example, for an OSR made of silica, a 1 degree temperature increase increases the center wavelength by 0.01 nm. The beam splitter reflects a small fraction of the input signal power to the photodiode PD1. The power transmitted through the splitter is made incident on the OSR. This signal is partially reflected by the OSR and partly transmitted through it. The transmitted signal is the desired signal which is reshaped to have a large extinction ratio by FM-to-AM conversion by the OSR and is detected by the high speed receiver. The power reflected from the OSR impinges on the photodiode PD2 and is used to track the wavelength of the incident signal. A locking circuit calculates the ratio of the signals from PD1 and PD2 and keeps the ratio PD2/PD1 at a constant by adjusting the temperature of the OSR.

To keep the ratio of PD2/PD1 constant, the wavelength-locking system may also include a wavelength locking circuit, as described in pending prior U.S. patent application Ser. No. 11/272,100, filed Nov. 8, 2005 by Daniel Mahgerefteh et al. for POWER SOURCE FOR A DISPERSION COMPENSATION FIBER OPTIC SYSTEM; which patent application is hereby incorporated herein by reference.

Modifications

It will be understood that many additional changes in the details, materials, steps and arrangements of parts, which have been herein described and illustrated in order to explain the nature of the invention, may be made by those skilled in the art while remaining within the principles and scope of the present invention.

What is claimed is:

1. A fiber optic system comprising:
a frequency modulated source configured to generate an output having one frequency portions and zero frequency portions;
an optical transmission fiber positioned to receive the output of the frequency modulated source;
an optical filter positioned to receive the output of the optical transmission fiber; and
an optical receiver positioned to receive the output of the optical filter;
characterized in that:
an optical spectrum reshaper is positioned between the frequency modulated source and the optical transmission fiber; and
wherein the optical filter is a narrow band pass filter relative to the bit rate of the transmitted signal and the one frequency portions have a spectrum positioned at a peak logarithmic derivative of the optical filter.

2. A fiber optic system comprising:
a frequency modulated source configured to generate an output having one frequency portions and zero frequency portions;
an optical transmission fiber positioned to receive the output of the frequency modulated source;
an optical filter positioned to receive the output of the optical transmission fiber; and
an optical receiver positioned to receive the output of the optical filter;
characterized in that:
the optical filter is an optical spectrum reshaper and the one frequency portions have a spectrum positioned at a peak logarithmic derivative of the optical spectrum reshaper.

3. An optical receiver for use with a transmission system comprising a frequency modulated source configured to generate an output having one frequency portions and zero frequency portions and an optical transmission fiber positioned to receive the output of the frequency modulated source, wherein the optical receiver comprises:
an optical filter positioned to receive the output of the optical transmission fiber; and
a photodetector positioned to receive the 6utput of the optical filter;
characterized in that:
an optical spectrum reshaper is positioned between the frequency modulated source and the optical transmission fiber; and
wherein the one frequency portions have a spectrum positioned at a peak logarithmic derivative of the optical spectrum reshaper.

4. An optical receiver according to claim 3 wherein the receiver further comprises a tracking assembly for tracking the wavelength of the input optical signal transmitted through the fiber.

5. An optical receiver for use with a transmission system comprising a frequency modulated source configured to generate an output having one frequency portions and zero frequency portions and an optical transmission fiber positioned to receive the output of the frequency modulated source, wherein the optical receiver comprises:
an optical filter positioned to receive the output of the optical transmission fiber; and
a photodetector positioned to receive the output of the optical filter;
characterized in that:

the optical filter is an optical spectrum reshaper and the one frequency portions have a spectrum positioned at a peak logarithmic derivative of the optical spectrum reshaper.

6. An optical receiver according to claim 5 wherein the receiver further comprises a tracking assembly for tracking the wavelength of the input optical signal transmitted through the fiber.

7. A method for transmitting a signal, comprising:
using the signal to frequency modulate an optical source to generate an output having one frequency portions and zero frequency portions;
directing the output of the frequency modulated source into an optical spectrum reshaper the one frequency portions have a spectrum positioned at a peak logarithmic derivative of the optical spectrum reshaper;
directing the output of the optical spectrum reshaper into an optical transmission fiber;
directing the output of the optical transmission fiber into an optical filter, wherein the optical filter is a narrow band pass having a bandwidth equal to between about 0.6 and 1.3 times relative to a bit rate of the output of the optical source; and
directing the output of the optical filter into an optical receiver.

8. A method for transmitting a signal, comprising:
using the signal to frequency modulate an optical source, the optical source generating an output having one frequency portions and zero frequency portions;
directing the output of the frequency modulated source into an optical transmission fiber;
directing the output of the optical transmission fiber into an optical filter, wherein the optical filter is an optical spectrum and the one frequency portions have a spectrum positioned at a peak logarithmic derivative of the optical spectrum reshaper; and directing the output of the optical spectrum reshaper into an optical receiver.

* * * * *

UNITED STATES PATENT AND TRADEMARK OFFICE
CERTIFICATE OF CORRECTION

PATENT NO. : 7,639,955 B2  Page 1 of 1
APPLICATION NO. : 11/447662
DATED : December 29, 2009
INVENTOR(S) : Zheng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Ninth Day of November, 2010

David J. Kappos
*Director of the United States Patent and Trademark Office*